(12) United States Patent
Ceravolo

(10) Patent No.: US 9,080,722 B2
(45) Date of Patent: Jul. 14, 2015

(54) ADJUSTABLE WEIGHT SUPPORTING APPARATUS AND METHOD

(71) Applicant: Frank Carmel Ceravolo, Stip (MK)

(72) Inventor: Frank Carmel Ceravolo, Stip (MK)

( * ) Notice: Subject to any disclaimer, the term of this patent is extended or adjusted under 35 U.S.C. 154(b) by 113 days.

(21) Appl. No.: 13/684,378

(22) Filed: Nov. 23, 2012

(65) Prior Publication Data

US 2014/0145044 A1    May 29, 2014

(51) Int. Cl.
| | | |
|---|---|---|
| B66F 3/10 | (2006.01) |
| F16M 11/26 | (2006.01) |
| F16M 11/22 | (2006.01) |
| B66F 3/00 | (2006.01) |

(52) U.S. Cl.
CPC ............... *F16M 11/26* (2013.01); *F16M 11/22* (2013.01); *B66F 3/00* (2013.01); *F16M 2200/028* (2013.01)

(58) Field of Classification Search
USPC .............. 248/157, 419, 163.1, 172, 432, 188, 248/188.8, 188.91, 351, 354.1, 354.3, 248/354.5, 354.4; 211/175; 254/11, 14, 254/418, 420, 419, 84, 32, 29 R, 30, 29 A, 254/16, 17, 136, 137, 138, 291, 143, 249
See application file for complete search history.

(56) References Cited

U.S. PATENT DOCUMENTS

| | | | |
|---|---|---|---|
| 235,054 A | 11/1880 | Gatrell |
| 1,416,896 A | 5/1922 | Simmons |
| 1,499,280 A | 6/1924 | Alheit |
| 1,521,764 A | 1/1925 | Graver |
| 1,894,293 A | 1/1933 | Green |
| 2,439,854 A | 4/1946 | Lipski |
| 2,514,095 A | 7/1950 | Schreiber |
| 2,529,292 A | 11/1950 | Greenfield |
| 2,912,703 A * | 11/1959 | Murphy ........................... 4/494 |
| 3,028,142 A | 4/1962 | Friesen |
| 3,047,269 A | 7/1962 | Renshaw |
| 3,178,148 A | 4/1965 | Goodale |
| 3,232,584 A | 2/1966 | Miles |
| 3,313,505 A | 4/1967 | Petrie |
| 3,355,136 A | 11/1967 | Staples |
| 3,493,209 A | 2/1970 | Brammer |
| 3,599,923 A | 8/1971 | Hunnicutt |
| 3,802,658 A | 4/1974 | Binding |
| 3,920,212 A | 11/1975 | Westwood |
| 3,970,278 A | 7/1976 | Studer |
| 4,009,855 A | 3/1977 | Hoffman |
| 4,021,012 A | 5/1977 | Miller |
| 4,042,202 A | 8/1977 | Molinari |

(Continued)

OTHER PUBLICATIONS

Christopher, K. et al.: "Apparatus and Method for Collapsible Vehicle Jack Stand," Non-published U.S. Appl. No. 13/477,817, filed May 22, 2012.

*Primary Examiner* — Alfred J Wujciak
(74) *Attorney, Agent, or Firm* — Malin Haley DiMaggio & Bowen, P.A.

(57) ABSTRACT

An adjustable weight supporting apparatus is provided with a horizontal member, vertical member and legs. The weight supporting apparatus may be used to support the weight of an automobile or other object. The horizontal member may be placed on a lifting device, which may be lifted to contact an object. Legs and the vertical member may be added to the horizontal member to support the weight without a lifting force, which may be temporarily fixed in place with one or more pin. The horizontal member may include an elongated portion and a cuff. Various aspects of the apparatus may be adjusted to support a desired object at a desired height and/or footprint to provide sufficient access under the object.

6 Claims, 4 Drawing Sheets

(56) References Cited

U.S. PATENT DOCUMENTS

| | | | | |
|---|---|---|---|---|
| 4,141,526 | A | 2/1979 | John | |
| 4,245,808 | A | 1/1981 | John | |
| 4,330,104 | A | 5/1982 | Klok | |
| 4,404,780 | A | 9/1983 | Josephson | |
| 4,479,634 | A | 10/1984 | Blatz | |
| 4,553,727 | A | 11/1985 | Arzouman | |
| 4,811,924 | A | 3/1989 | Walters | |
| 4,856,747 | A | 8/1989 | Gano | |
| 4,934,015 | A * | 6/1990 | Mink | 15/268 |
| 5,110,089 | A | 5/1992 | Slay | |
| 5,150,484 | A * | 9/1992 | Whitten, Jr. | 5/9.1 |
| 5,165,665 | A | 11/1992 | Jolivette | |
| 5,180,131 | A | 1/1993 | Few | |
| 5,228,651 | A | 7/1993 | Warner | |
| 5,297,779 | A | 3/1994 | Collins | |
| D348,340 | S | 6/1994 | Collins | |
| 5,520,360 | A | 5/1996 | Wensman | |
| 5,660,637 | A * | 8/1997 | Dodge | 118/500 |
| 5,915,672 | A | 6/1999 | Dickey | |
| 5,979,854 | A * | 11/1999 | Lundgren et al. | 248/354.3 |
| 6,119,284 | A * | 9/2000 | Cosman | 4/498 |
| 6,223,358 | B1 * | 5/2001 | DePietro | 4/498 |
| 6,334,598 | B1 | 1/2002 | Gutzke | |
| 6,443,413 | B1 | 9/2002 | Hawkins | |
| 6,644,615 | B1 | 11/2003 | Liu | |
| 6,691,983 | B2 | 2/2004 | Arzouman | |
| 6,966,540 | B2 | 11/2005 | Falk | |
| 7,147,211 | B2 | 12/2006 | Porter | |
| 7,654,036 | B2 * | 2/2010 | Shouse et al. | 47/39 |
| 7,878,482 | B2 | 2/2011 | Hernandez | |
| 8,132,787 | B1 | 3/2012 | Audet | |
| 8,181,936 | B2 | 5/2012 | Walton | |
| 8,348,071 | B1 * | 1/2013 | Janlert | 211/175 |
| 8,398,056 | B1 | 3/2013 | Morrison | |
| 2008/0099745 | A1 | 5/2008 | Arzouman | |

* cited by examiner

ADJUSTABLE WEIGHT SUPPORTING APPARATUS AND METHOD

FIELD OF THE INVENTION

The invention relates to a weight supporting apparatus. More particularly, the invention relates to an adjustable weight supporting apparatus usable in automotive application.

BACKGROUND

With many modern automobiles, especially high performance makes such as Porsche, only a limited amount of space exists under the chassis of the automobile whereby a lifting device may be applied. In many cases, due to this limited space, and once the automobile has been lifted, it is not possible to place jack stands, aka "axle stands" or "safety stands," under the chassis because that limited space to receive the jack stand is now being occupied by a lifting device. Often, the lifting device is a hydraulic floor jack, which occupies space to a degree that there is no room left for the proper placement of jack stands. These limited spaces to receive a jack stand have been designated by the factory, and supporting the automobile with jack stands outside of these designated spaces presents hazards to the vehicle as well as the person working under or around the vehicle.

What is needed is a weight supporting apparatus that is easily locatable under a weight to be supported. What is also needed is a weight supporting apparatus adjustable to fit a given application. Additionally, what is needed is a method to use an adjustable weight supporting apparatus to support a weight with limited clearance. What is also needed is a weight supporting device that may be substantially disassembled for convenient storage.

SUMMARY

According to embodiments of the present invention, a weight supporting apparatus is provided that is easily locatable under an object, e.g., an automobile, that is to be supported. Additionally, the weight supporting apparatus is adjustable to fit a given application. A method is also described for using an adjustable weight supporting apparatus to support an object, e.g., an automobile, with limited clearance. Furthermore, the weight supporting apparatus can be a weight supporting device that may be substantially disassembled for convenient storage.

Accordingly, the invention features an adjustable weight supporting apparatus that includes a vertical member, a leg, and a horizontal member for supporting an object, the horizontal member having an elongated portion. The leg can include a first end and a second end, wherein the first end can be insertable into the horizontal member to a predetermined length. The vertical member can support the leg, and the second end of the leg can be insertable into the vertical member to a selectable depth.

In another aspect, the invention can feature the first end of the leg being insertable into the horizontal member to the predetermined length, and the predetermined length can be selectable from a plurality of predetermined length.

In another aspect, the invention can feature the leg including a channel and a pin that is locatable in the channel to selectively fix the depth of insertion for the leg.

In another aspect, the invention can feature the first end of the leg including a lock channel to align with a lock hole included on the horizontal member, the pin being insertable through the lock hole and the lock channel to selectively fix the depth of the first end of the leg in the horizontal member. The second end of the leg can feature an adjustment channel to align with an adjustment hole included on the vertical member, the pin being insertable through the adjustment hole and the adjustment channel to temporarily fix the depth of the second end of the leg in the vertical member.

In another aspect, the invention can feature a top surface of the horizontal member including a pad to engage the object.

In another aspect, the invention can feature a bottom surface of the horizontal member including a jack adapter to receive the lifting device.

In another aspect, the invention can feature the horizontal member further including a cuff locatable adjacent to the object, the cuff at least partially encircling and being slidably positioned about the elongated portion to receive the object and a lifting device, and the location of the cuff being selectively fixable to the elongated portion.

In another aspect, the invention can feature the cuff including a compression member to selectively fix the cuff in position respective to the elongated portion.

In another aspect, the invention can feature the vertical member including a first angled portion having a top and bottom end, a second angled portion having a top and bottom end, a vertical portion having a top and bottom end, and a horizontal portion having a first and second end. The first angled portion, second angled portion, and vertical portion can be connected at their respective top ends. The bottom end of the vertical portion can be connected approximately orthogonally to the horizontal portion. The first and second ends of the horizontal portion can be connected respectively to the first and second angled portions. A foot can be included at the bottom ends of the first angled portion and second angled portion, wherein the foot can interface with a supporting surface.

The invention can also feature an adjustable weight supporting apparatus that includes a vertical member, a leg having a first end and a second end, and a horizontal member for supporting an object, the horizontal member having a locking hole. The first end of the leg can feature a locking channel and the second end of the leg can feature an adjusting channel. The first end of the leg can be insertable into the horizontal member to a depth selectable by aligning the locking channel with the locking hole, with the depth being temporarily fixable by passing a pin through the locking hole and the locking channel. The vertical member can include an adjusting hole to support the leg. The second end of the leg can be insertable into the vertical member to a depth selectable by aligning the adjusting channel with the adjusting hole, with the depth being temporarily fixable by passing the pin through the adjusting hole and the adjusting channel.

In another aspect, the invention can feature the horizontal surface including an elongated portion and a cuff locatable adjacent to the object, the cuff at least partially encircling and being slidably positioned about the elongated portion to receive the object and a lifting device. The location of the cuff can be selectively fixable to the elongated portion.

In another aspect, the invention can feature the cuff including a compression member to selectively fix the cuff in position respective to the elongated portion.

In another aspect, the invention can feature a top surface of the horizontal member including a pad to engage the object, and a bottom surface of the horizontal member including a jack adapter to receive the lifting device.

In another aspect, the invention can feature a foot locatable at a bottom end of the vertical member to interface with a supporting surface.

In another aspect, the invention can feature the vertical member including a first angled portion having a top and bottom end, a second angled portion having a top and bottom end, a vertical portion having a top and bottom end, and a horizontal portion having a first and second end. The first angled portion, second angled portion, and vertical portion can be connected at their respective top ends. The bottom end of the vertical portion can be connected approximately orthogonally to the horizontal portion. The first and second ends of the horizontal portion can be connected respectively to the first and second angled portions. A foot can be included at the bottom ends of the first angled portion and second angled portion.

The invention also features a method that can be used for adjustably supporting an object using a weight supporting apparatus, wherein the weight supporting apparatus can include a vertical member, a leg, and a horizontal member for supporting the object, the horizontal member including an elongated portion and a cuff. The method can include the steps of: (a) locating the cuff adjacent to the object, the cuff at least partially encircling and being slidably positioned about the elongated portion to receive the object and a lifting device, and the location of the cuff being fixable to the elongated portion; (b) engaging the horizontal member by a lifting device to apply a lifting force from the lifting device to the horizontal member; (c) engaging the object by the horizontal member to apply the lifting force from the horizontal member to the object; (d) inserting a first end of the leg into the horizontal member to a selectable depth and temporarily fixing leg to the horizontal member; (e) inserting a second end of the leg into the vertical member to a selectable depth and temporarily fixing the leg to the vertical member; and (f) removing the lifting device by ceasing to apply the lifting force.

The method can also feature a bottom end of the vertical member including a foot to interface with a supporting surface.

The method can also feature the legs including channels. In another step of the method, steps (d) and (e) of the method can further include the step of: (g) inserting a pin in the channel to selectively fix the depth of insertion for the leg.

The method can also feature the first end of the leg including a lock channel to align with a lock hole included on the horizontal member and the second end of the leg including an adjusting channel to align with an adjusting hole included on the vertical member. In another step of the method, step (d) of the method can further include the step of: (h) inserting a pin through the lock hole and the lock channel to temporarily fix the depth of the first end of the leg in the horizontal member. In another step of the method, step (e) of the method can further include the step of: (i) inserting a pin through the adjusting hole and the adjusting channel to temporarily fix the depth of the second end of the leg in the vertical member.

The method can also feature a top surface of the horizontal member including a pad to engage the object, and a bottom surface of the horizontal member including a jack adapter to receive the lifting device.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1:
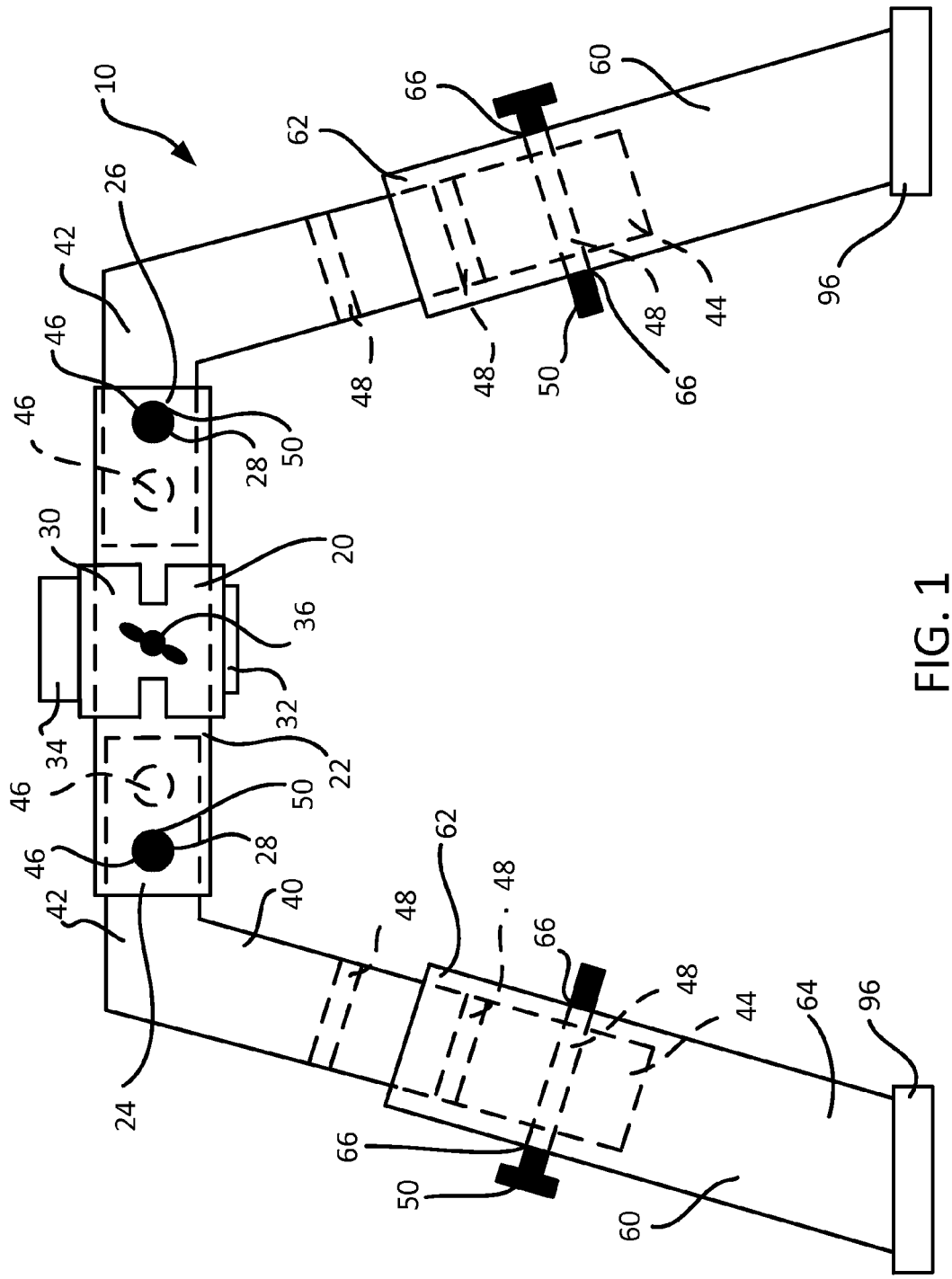
FIG. 1 is a front elevation view of a weight supporting apparatus, according to an embodiment of the present invention.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The present invention will now be described in detail with reference to embodiments thereof as illustrated in the accompanying drawings. In the following description, an adjustable weight supporting apparatus will be discussed. Those of skill in the art will appreciate alternative labeling of the adjustable weight supporting apparatus as a weight supporting apparatus, jack stand, apparatus, device, the invention, or other similar names. Skilled readers should not view the inclusion of any alternative labels as limiting in any way.

Additionally, the following disclosure may be described in the context of lifting an automobile to perform repairs and include examples related to the same. This context of disclosure has been chosen to clearly illustrate an embodiment of the present invention. However, skilled artisans will appreciate additional applications for the present invention, which may be use outside of the automotive context. Other embodiments may include virtually any scenario where a weight is supported. As such, the present invention should not be limited to applications of supporting the weight of an automobile.

Referring now to FIG. 1, the weight supporting apparatus 10 will now be discussed. Generally, the apparatus 10 may include a horizontal member 20, legs 40, and a vertical member 60. The horizontal member 20 may include a cuff 30 and an elongated portion 22. The vertical member 60 may include a foot 96. A leg 40 may be inserted into the horizontal member 20 and/or the vertical member 60 to a securable depth, which can be temporarily fixed. In a method of using the apparatus 10, lifting force from a lifting device may be transferred through the horizontal member 20 to lift the weight of an object, such as an automobile. The horizontal member 20 may then be configured in a temporarily fixed position using the legs 40 and vertical member 60.

Figure 3:
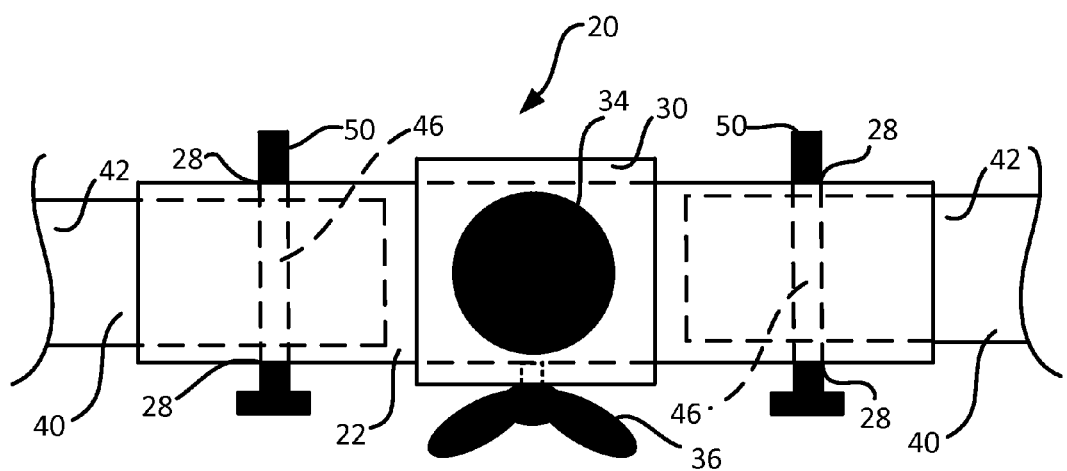
FIG. 3 is a top plan view of the horizontal member receiving legs, according to an embodiment of the present invention.
Figure 4:
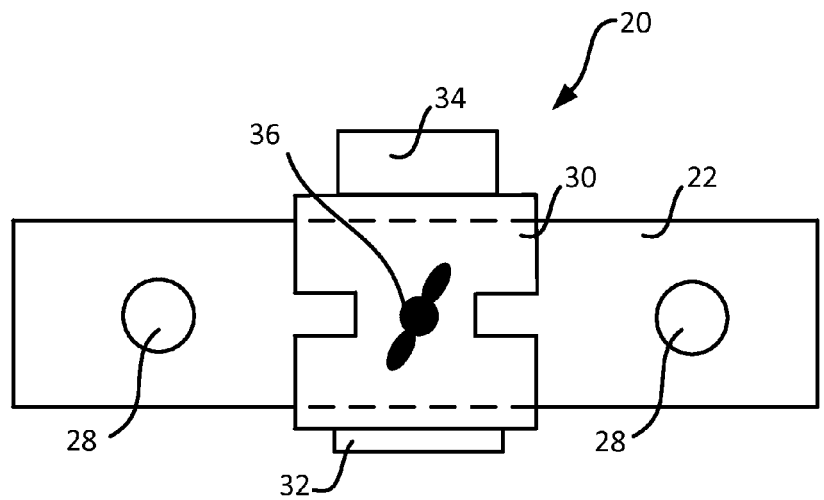
FIG. 4 is a front elevation view of the horizontal member, according to an embodiment of the present invention.
Figure 5:
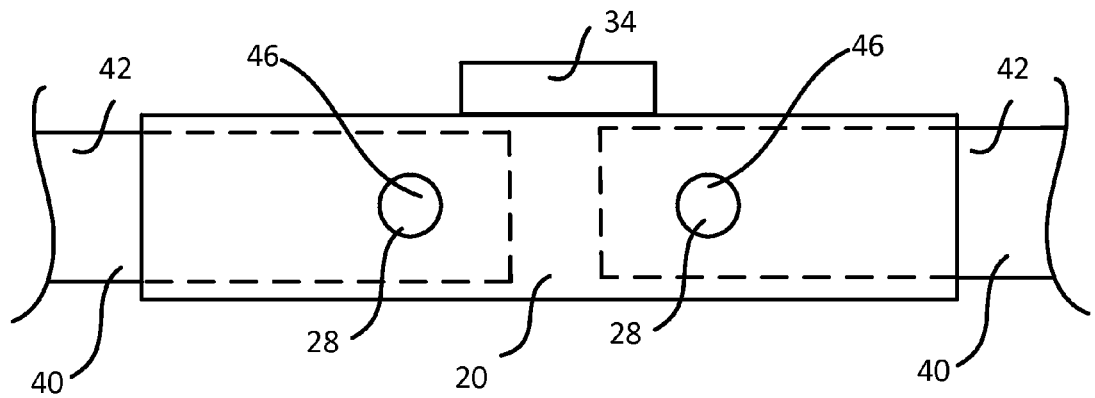
FIG. 5 is a front elevation view of the horizontal member receiving legs, according to an alternative embodiment of the present invention.

Referring now to FIGS. 1 and 3-4, the horizontal member 20 will now be discussed in greater detail. The horizontal member 20 may be positioned below a weight to be supported. Using a lifting device, the horizontal member 20 may be lifted to contact the object to be supported. After the horizontal member 20 and the object have been lifted to a desired height, legs 40 may be added to the horizontal member 20 to support the weight of the object. The horizontal member 20 may be constructed of strong materials to support a large amount of weight, such as steel, aluminum, or other high strength materials. Alternatively, the horizontal member 20 may made with other materials of varying strength characteristic as applications of the present invention may vary.

The horizontal member 20 may include a top surface and a bottom surface. The top surface may interface with a weight to be lifted and/or supported. The bottom surface may interface with a lifting device, which may provide lifting force to the horizontal member 20. The lifting force may be communicated from the lifting device, through the horizontal member 20, and to the object to be lifted and/or supported. The horizontal member 20 may include sides, which may communicate the lifting force from the bottom of the horizontal member 20 to the top of the horizontal member 20.

In one configuration, without limitation, the horizontal member 20 may be elongated square or rectangular shaped. However, skilled artisans will appreciate additional shapes capable of supporting a weight, and should not view the present invention as limited to solely square or rectangular configurations. The elongated length of the horizontal member 20 may be sufficiently long to accommodate one or more legs 40. In one embodiment, the horizontal member 20 may be configured to receive two legs 40. Each leg 40 may be inserted into one of the ends of the horizontal member 20 to a selectable depth. As will be discussed in greater detail later in this disclosure, the legs 40 may be temporarily fixed into place within the horizontal member 20.

More specifically, in one embodiment, a horizontal member 20 constructed of steel and/or aluminum may have a substantially flat top and bottom surface, which may be approximately equal width. Two side portions may extend upward from the edges of the bottom portion at an approximately orthogonal angle, to the top portion such to support the weight of the object located above the top portion. The top, bottom, and side portions may form a rectangular box with a substantially open interior. The sides of the box may be substantially open as well. The box may be extended lengthwise from a first end 24 to a second end 26, with a length sufficient to receive a leg 40 in both the first end 24 and the second end 26 of the horizontal member 20 at varying depths. To receive the legs 40, the interior dimensions of the horizontal member 20 may be more than the exterior dimensions of the leg 40, such that the leg 40 may fit into the horizontal member 20. The clearance between the interior dimensions of the horizontal member 20 and the exterior dimensions of the leg 40 may be small, such to provide a substantially solid and strong fit with minimal motion or play of the leg 40 when inserted into the horizontal member 20. In some embodiments, the legs 40 may be inserted into the horizontal member 20 to a predetermined depth that is set during manufacturing. In other embodiments, the legs 40 can be inserted into the horizontal member 20 to any of a plurality of selectable depths (e.g., 2, 3, 4, 5, 6, or more selectable depths each of which differs from the other selectable depths) using a pin that may be passed through a lock hole of the horizontal member and a lock channel of each leg 40 to fix each leg in place.

In additional embodiments, the horizontal member 20 may have multiple portions extending from a point, which may be approximately centrally located. In this configuration, the horizontal member 20 may receive a plurality of legs 40 from one or more directions. For example, a horizontal member 20 may have three elongated portions 22 extending from a center point, which may receive a leg 40 in each elongated portion 22. In another example, a horizontal member 20 may include five elongated portions 22 extending from a center point. In this example, three legs 40 may be inserted into three of the five elongated portions 22, providing flexibility in the working space provided under the weight supporting apparatus 10. Skilled artisans will appreciate that these examples are provided without limitation.

The horizontal member 20 may include multiple components, such as an elongated portion 22. In one embodiment, the horizontal member 20 can include a cuff 30. The elongated portion 22 of the horizontal member 20 may extend lengthwise, and may have a substantially hollow interior. The elongated portion 22 may receive the legs 40, as discussed above. For example, the inner dimensions of the elongated portion 22 may be larger than the outer dimensions of a leg, such that the leg 40 may be inserted into the elongated portion 22 of the horizontal member 20 to a variable depth.

The cuff 30 may be designed with a similar shape as the elongated portion 22, but with slightly larger dimensions. The cuff 30 may have a substantially hollow interior. For example, the inner dimensions of the cuff 30 may be larger than the outer dimensions of the elongated portion 22 to permit the elongated portion 22 to be received by the cuff 30. The cuff 30 may then be slidably positioned along the length of the elongated portion 22. The cuff 30 may include a compression member 36, e.g., a thumbscrew, to temporarily fix its location in a desired position on the length of the elongated portion 22. For example, a thumbscrew 36 may be passed into a threaded hole on the cuff 30. The compression member 36 may be loosened to allow the cuff 30 to be moved along the elongated portion 22. Conversely, the compression member 36 may be tightened to reduce or substantially eliminate movement along the elongated portion 22. In an exemplary embodiment, the compression member 36 does not penetrate into the horizontal member 20 but rather is tightened down in contact against the horizontal member to hold the cuff 30 in a temporarily fixed position.

The cuff 30 can be used to allow the legs 40 to be inserted into the horizontal member 20 in limited clearance (or tight) spaces, for example, under the vehicle, by sliding the horizontal member through the cuff. The horizontal member 20 can be slidably pushed through the cuff 30 in a direction away from the limited clearance space under the automobile. The legs 40 can be inserted into the horizontal member 20 next or proximal to the limited clearance space under the automobile. The horizontal member 20 can then be positioned in a desired position under the automobile by the user. The horizontal member 20 can be slidably pushed through the cuff 30 while the cuff is positioned under the weight of the automobile. The cuff 30 can include slots to allow the cuff's edges to extend beyond one or more protruding ends of each attachment pin. The slots of the cuff 30 permit the horizontal member 20 to be easily adjusted into a desired position.

The cuff 30 may receive and substantially encircle the elongated portion 22. Similarly, the elongated portion 22 may receive and substantially encircle one or more leg 40. In this embodiment, lifting force may be provided from the lifting device to the cuff 30 which may be transferred to the object being lifted. Once the object has been lifted to the desired height, the legs 40 may be inserted to support the object without lifting force being provided by the lifting device. While being supported by the apparatus 10, the weight of the object may be translated from the cuff 30 to the elongated portion 22 of the horizontal member 20, and further transferred to the legs 40. The remaining operation of the weight supporting apparatus 10 will be discussed in greater detail below.

A pad 34 may be included between the top surface of the horizontal member 20 and the bottom of the object being lifted and/or supported. The pad 34 may be attached to the top of the horizontal member 20. The pad 34 may be removable or permanently fixed. The pad 34 may be made of virtually any material capable of supporting a desired object, such as, for example, a rubber, composite, metallic, antioxidants, bonding materials, or other material. The pad 34 may be shaped to fit a surface of an object where it will be received. For example, an automobile may include an indented and/or protruding surface to receive a hydraulic and/or emergency jack. The pad 34 may be shaped to receive this surface, which may increase security and stability of the contact between the weight supporting apparatus 10 and the object being supported. The pad 34 may be interchangeable with additional pads 34 constructed from other materials and/or shapes. The pad 34 may also decrease the impacting force between the apparatus 10 and the object being supported while the horizontal member 20 is lifted into place.

A jack adapter 32 may be included between the bottom surface of the horizontal member 20 and the top of the object lifting device. The jack adapter 32 may be attached to the bottom of the horizontal member 20. The jack adapter 32 may be removable or permanently fixed. The jack adapter 32 may be made of virtually any material capable of supporting the horizontal member 20 and a desired object, such as, for example, a rubber, composite, metallic, antioxidants, bonding materials, or other material. The jack adapter 32 may be shaped to fit a surface of the lifting device. For example, a hydraulic jack may include a cupped surface to contact an object being lifted. The jack adapter 32 may be shaped to be received by this surface, which may increase security and stability of the contact between the lifting device and the weight supporting apparatus 10. The jack adapter 32 may be interchangeable with additional jack adapters 32 constructed of other materials and/or shapes.

In an embodiment wherein the horizontal member 20 includes an elongated portion 22 and a cuff 30, the pad 34 and/or jack adapter 32 may be included on the cuff 30. The cuff 30 may be positioned along the elongated portion 22 to be received by a desired point of the object being supported. For example, the cuff 30 may be slidably located under an automobile to the contact point designated for an emergency jack. Once the cuff 30 is set to the desired location, it may be temporarily fixed along the elongated portion 22 using the compression member 36.

The horizontal member 20 may include a lock hole 28. In one embodiment, the horizontal member 20 may include a plurality of lock holes 28 at its first and second ends 24, 26. For example, a pair of lock holes 28 may be included at the first end 24 of the horizontal member 20. The pair of lock holes 28 may be aligned to allow a pin 50 to pass into a first lock hole of the pair, through the interior space of the horizontal member 20, and out of the second lock hole of the pair. One or more pairs of lock holes 28 may be included each end of the horizontal member 20.

Referring now to FIGS. 1-3 and 5, the legs 40 will now be discussed in greater detail. The legs 40 may be located between the horizontal member 20 and the vertical member 60. The legs 40 may have a first end 42 to interface with the horizontal member 20 and a second end 44 to interface with a vertical member 60. The legs 40 may be temporarily fixed to the horizontal and/or vertical members 20, 60 to transfer weight from the horizontal member 20 to the vertical member 60. For example, weigh may be received by the horizontal member 20 from an object being supported, which may be transferred to and supported by a first end 42 of the legs 40. The weight may then be transferred to and supported by the vertical member 60 through the second end 44 of the legs 40. The vertical member 60 may ultimately transfer the weight to a supporting surface, such as the ground or a shop floor.

The legs 40 may be constructed of a material of sufficient strength to support a desired amount of weight. More specifically, the legs 40 may be constructed using steel, aluminum, composites, and/or other materials. The legs 40 may be solid or hollow, and may be constructed as one monolithic piece or formed from multiple welded pieces. In one embodiment, a leg 40 may be fixedly attached to a vertical member 60. As discussed above, the legs 40 may be shaped similarly to the horizontal member 20 in which the leg 40 may be inserted, having outer dimensions that are smaller than the inner dimensions of the horizontal member 20. Similarly, the legs 40 may be shaped similarly to a vertical member 60 in which the leg 40 may be inserted, having outer dimensions that are smaller than the inner dimensions of the vertical member 60. The first end 42 and the second end 44 of the legs 40 may have similar or dissimilar shapes.

The legs 40 may include one or more lock channels 46 at its first end 42. The lock channels 46 may pass substantially through the interior of the leg 40. After being inserted into the horizontal member 20, the lock channels 46 may be aligned with the lock hole 28 located on the horizontal member 20. A pin 50 or other device may be passed through the lock holes 28 on the horizontal member 20 and one or more lock channels 46 included by the first end 42 of the leg 40 to temporarily fix the leg 40 within the horizontal member 20. The leg 40 may be unfixed from the horizontal member 20 by removing the pin 50 from the lock holes 28 and lock channel 46.

Similarly, the legs 40 may include one or more adjusting channels 48 at its second end 44. The adjusting channels 48 may pass substantially through the interior of the leg. After being inserted into the vertical member 60, the adjusting channels 48 may be aligned with adjusting holes 66 located on the vertical member 60. A pin 50 or other device may be passed through the adjusting holes 66 on the vertical member 60 and one or more adjusting channels 48 included by the second end 44 of the leg 40 to temporarily fix the leg 40 within the vertical member 60. The leg 40 may be unfixed from the vertical member 60 by removing the pin 50 from the adjusting holes 66 and adjusting channel 48.

In one embodiment, the leg 40 may include a plurality of lock channels 46 and/or adjusting channels 48. The dimensions of the weight supporting apparatus 10 may be adjusted by selecting a channel of desired depth to pass the pin 50 through. For example, a wider work space under the apparatus 10 may be created under an automobile by passing the pin 50 through the lock holes 28 and lock channel 46 that aligns with the lock holes 28 at a small insertion depth. Conversely, a more tightly contained apparatus 10, which may provide additional workspace outside of the footprint of the apparatus 10, may be created by passing the pin 50 through the lock holes 28 and lock channel 46 that aligns with the lock holes 28 at a large insertions depth.

As an additional example, a higher work space under the apparatus 10 may be created under an automobile by passing the pin 50 through the adjusting holes 66 and adjusting channel 48 that aligns with the adjusting holes 66 at a small insertion depth. Conversely, a lower workspace may be created by passing the pin 50 through the adjusting holes 66 and adjusting channel 48 that aligns with the adjusting holes 66 at a large insertions depth.

In an embodiment, the legs 40 may include a leg support bar. The leg support bar may be located adjacent to the legs 40 to reduce a risk of the legs 40 spreading outward. The leg support bar may be temporarily fixed to a leg 40 via channels and pins, an at least partially encircling cuff, or other technique. Skilled artisans will appreciate various supportive configurations for the leg support bar after having the benefit of this disclosure.

Figure 2:
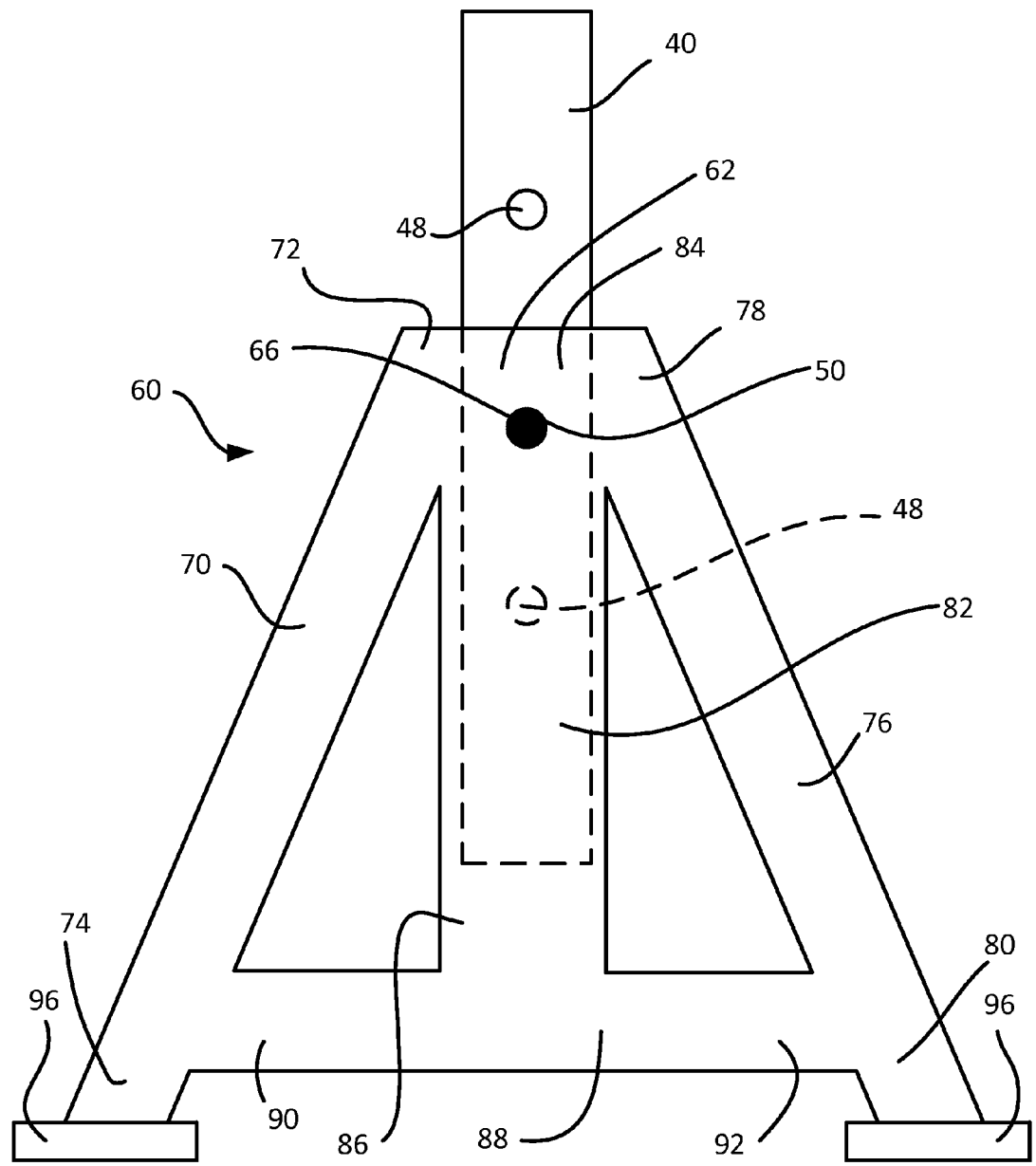
FIG. 2 is a side elevation view of a vertical member, according to an embodiment of the present invention.
Figure 6:
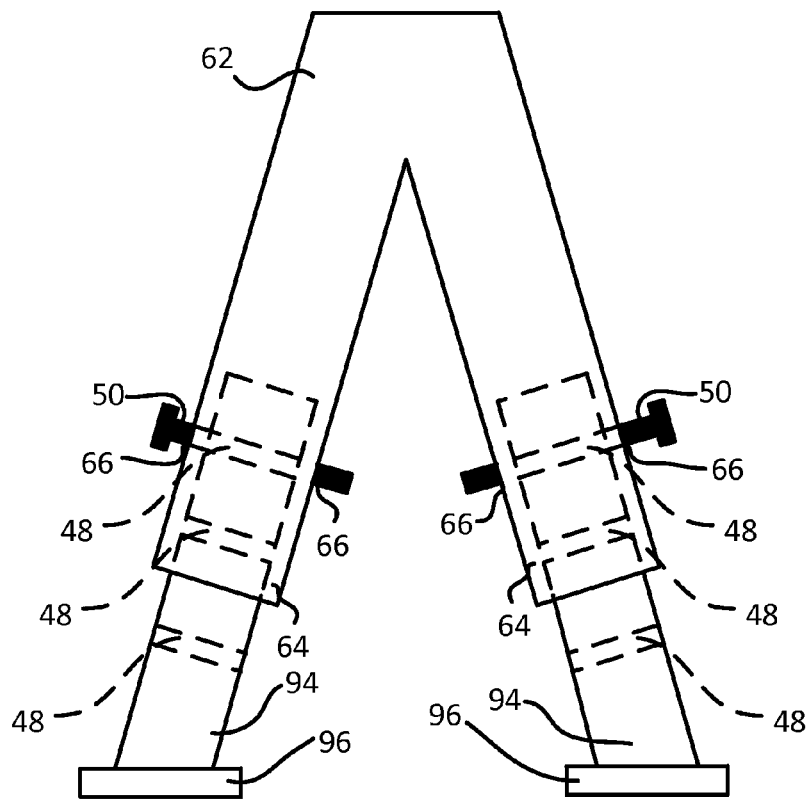
FIG. 6 is a side elevation of a vertical member, according to an alternative embodiment of the present invention.

Referring now to FIGS. 1-2 and 6, the vertical member 60 will now be discussed in greater detail. The vertical member 60 may include a top end 62 and a bottom end 64. A leg 40 may be received by the top end 62 of the vertical member 60. A foot 96 may optionally be included at the bottom end 64 of the vertical member 60, which may interface between the vertical member 60 and a supporting surface, such as the ground or a shop floor. The foot may be flat, beveled, rounded, and/or otherwise configured to interface with the supporting surface. For example, and without limitation, the foot may be shaped accordingly as not to mar a shop floor or garage work area.

The vertical member 60 may be positioned adjacent to a supporting surface, such as the ground or a shop floor. The vertical member 60 may be constructed of strong materials to support a large amount of weight, such as steel, aluminum, and/or other high strength materials. Alternatively, the vertical member 60 may be made using other materials, with varying strength characteristic, as applications of the present invention may vary.

In one configuration, without limitation, the vertical member 60 may include one or more elongated square or rectangular shaped pieces. However, skilled artisans will appreciate additional shapes capable of supporting a weight, and should not view the present invention as limited to solely configuration with square or rectangular components. The elongated length of the vertical member 60 may be sufficiently long to accommodate one or more legs 40. In one embodiment, the vertical member 60 may be configured to receive a leg 40. The leg 40 may be inserted into the top end of the vertical member 60 to a selectable depth. The legs 40 may be temporarily fixed into place within the vertical member 60.

To receive the legs 40, the interior dimensions of the vertical member 60 may be more than the exterior dimensions of the leg, such that the leg 40 may fit into the vertical member 60. The clearance between the interior dimensions of the vertical member 60 and the exterior dimensions of the leg 40 may be small, such to provide a substantially solid and strong fit with minimal motion or play of the leg 40 when inserted into the vertical member 60.

The vertical member 60 may include an adjusting hole 66. In one embodiment, the vertical member 60 may include a plurality of adjusting holes 66 at its top. For example, a pair of adjusting holes 66 may be included at the top end 62 of the vertical member 60. The pair of adjusting holes 66 may be aligned to allow a pin 50 to pass into a first adjusting hole of the pair, through the interior space of the vertical member 60, and out of the second adjusting hole of the pair. One or more pairs of adjusting holes 66 may be included by the vertical member 60.

Referring now to FIG. 2, along with the additional figures, an embodiment of the vertical member 60 will now be discussed as an example. Skilled artisans will appreciate additional embodiments and configurations of the vertical member 60, and should not read any limitation into the following example. The vertical member 60 may be constructed from multiple portions, which may be welded or otherwise connected to one another. More specifically, the vertical member 60 may include a first angled portion 70, a second angled portion 76, and a vertical portion 82, each with a respective top end 72, 78, 84 and bottom end 74, 80, 86. The vertical member 60 may also include a horizontal portion 88, which may extend from the first angled portion 70 at a first end 90 to the second angled portion 76 at a second end 92. The first and second angled portions 70, 76, may include a foot 96 at their respective bottom ends 74, 80. The bottom end 86 of the vertical portion 82 may be received by and attached to the horizontal portion 88 at an approximately orthogonal angle.

Referring now to FIG. 6, along with the additional figures, an additional embodiment of the vertical member 60 will now be discussed. In the interest of clarity, reception of the legs 40 discussed above has been omitted form the drawing. In this embodiment, the vertical member 60 may receive a plurality of lower legs 94 at its bottom end 64. The lower legs 94 may be constructed and configured similarly to the legs 40 discussed above. However, conversely to the legs 40 discussed above, the lower legs 94 may be received by and extend outward from the bottom end 64 of vertical member 60. Similar to the legs 40 discussed above, the lower legs 94 may include one or more adjusting channels 48, which may be aligned with adjusting holes 66 to selectively and temporarily fix a position of the lower legs 94 within the vertical member 60. The height at which the weight supporting apparatus 10 is configured may be adjusted by passing a pin 50 through a desired adjusting channel 48 that corresponds with a desired insertion depth of the lower leg 94 within the vertical member 60. A foot 96 may optionally be attached to the bottom end of the lower leg 94.

In operation, the adjustable weight supporting apparatus 10 may be used to support an object by distributing its weight to a supporting surface, such as the ground. The method may first include locating the cuff 30 adjacent to the weight. The cuff 30 may at least partially encircle the elongated portion 22 allowing it to be slidably positioned to receive the weight of the object. The cuff 30 may also be positioned to receive the lifting device. The location of the cuff 30 may be selectively and temporarily fixable to the elongated portion 22, for example, by tightening a compression member 36 such as a thumb screw.

The lifting device may engage the horizontal member 20 to apply a lifting force from the lifting device to the horizontal member 20. The horizontal member 20 may then engage the object to apply the lifting force from the horizontal member 20 to the weight of the object. Prior to being engaged by the horizontal member 20, the object may support its own weight.

Once the object has been lifted, the first end 42 of a leg 40 may be inserted into the horizontal member 20 to a desired depth. The leg 40 may then be temporarily fixed at the desired depth within the horizontal member 20. More specifically, a pin 50 may be passed through the lock hole 28 of the horizontal member 20 and the lock channel 46 of the leg 40 to fix the leg 40 in place. This step may be repeated for each leg 40 being inserted into the horizontal member 20.

The second end 44 of the leg 40 may be inserted into the vertical member 60 to a selectable depth. The leg 40 may then be temporarily fixed at the desired depth within the vertical member 60. More specifically, a pin 50 may be passed through the adjusting hole 66 of the vertical member 60 and the adjusting channel 48 of the leg 40 to fix the leg 40 in place. This step may be repeated for each leg 40 being inserted into a vertical member 60. Skilled artisans will appreciate that the leg 40 may be secured in the horizontal member 20 and vertical member 60 in any order or simultaneously.

Once the desired number of legs 40 have been fixed in the horizontal member 20 and vertical members 60, the lifting device may be removed from under the horizontal member 20. The weight that was previously supported by the lifting device through the horizontal member 20 may now supported solely by the horizontal member 20, which is already in contact with the object of weight being supported. The weight may be transferred from the horizontal member 20 to the legs 40, which may further transfer the weight to the vertical members 60. The vertical members 60 may be in contact with a supporting surface, such as the ground or a shop floor, and may transfer the weigh to the supporting surface. If the vertical member 60 includes one or more foot 96, the weight may be transferred from the vertical member 60, through the foot 96, to the supporting surface.

To remove the weight supporting device, the horizontal member 20 should be engaged with the lifting device such that the lifting device is supporting the weight of the object. Once the legs 40 and vertical members 60 are not supporting any weight, they may be unfixed from the apparatus 10. More specifically, the pin 50 may be removed from the adjusting holes 66 of the vertical member 60 and the adjusting channels 48 of the legs 40 to remove the vertical member 60. Also, the pin 50 may be removed from the lock holes 28 of the horizontal member 20 and the lock channel 46 of the leg 40 to remove the leg 40 from the horizontal member 20. The lifting device may then be lowered, allowing the object to support its own weight. The horizontal member 20, which is no longer supporting any weight, may then be removed from the lifting device.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An adjustable weight supporting apparatus comprising:
a horizontal member comprising an elongated portion for supporting an object;
a plurality of legs comprising a first end and a second end, wherein each of first end is insertable into the horizontal member to a length; and
a plurality of vertical members to support the leg, the second end of the leg being insertable into the vertical member to a selectable height;
wherein the horizontal member is locatable adjacent to a lifting device;
wherein the plurality of vertical members comprise a first angled portion comprising a top and bottom end, a second angled portion comprising a top and bottom end, a vertical portion comprising a top and bottom end, and a horizontal portion comprising a first and second end; the first angled portion, second angled portion, and vertical portion being connected at their respective top ends; the bottom end of the vertical portion being connected approximately orthogonally to the horizontal portion; the first and second ends of the horizontal portion being connected respectively to the first and second angled portions; and a foot being includable at the bottom ends of the first angled portion and second angled portion, wherein the foot interfaces with a supporting surface.

2. The apparatus of claim 1, wherein a top surface of the horizontal member comprises a pad to engage the object.

3. The apparatus of claim 1, wherein a bottom surface of the horizontal member comprises a jack adapter to receive the lifting device.

4. The apparatus of claim 1, wherein the horizontal member further comprises a cuff locatable adjacent to the object, the cuff at least partially encircling and being slidably positioned about the elongated portion to receive the object and the lifting device, wherein location of the cuff is selectively fixable to the elongated portion.

5. The apparatus of claim 4, wherein the cuff comprises a compression member selectively fix the cuff in position respective to the elongated portion.

6. An adjustable weight supporting apparatus comprising:
a horizontal member for supporting an object, the horizontal member comprising a locking hole;
a plurality of legs comprising a first end and a second end, where each of first end comprise a locking channel and each of second end comprise an adjusting channel, each first end of the legs being insertable into the horizontal member to a length selectable by aligning the locking channel with the locking hole, the length being temporarily fixable by passing a pin through the locking hole and the locking channel; and
a plurality of vertical members comprising an adjusting hole to support the leg, the second end of the leg being insertable into the vertical members to a height selectable by aligning the adjusting channel with the adjusting hole, the length being temporarily fixable by passing the pin through the adjusting hole and the adjusting channel
wherein the horizontal member is receivable by a lifting device;
wherein the vertical members comprises a first angled portion comprising a top and bottom end, a second angled portion comprising a top and bottom end, a vertical portion comprising a top and bottom end, and a horizontal portion comprising a first and second end; the first angled portion, second angled portion, and vertical portion being connected at their respective top ends; the bottom end of the vertical portion being connected approximately orthogonally to the horizontal portion; the first and second ends of the horizontal portion being connected respectively to the first and second angled portions; a foot being includable at the bottom ends of the first angled portion and second angled portion.

* * * * *